Patented Apr. 3, 1923.

1,450,412

UNITED STATES PATENT OFFICE.

LEON F. DOUGLASS, OF SAN RAFAEL, CALIFORNIA.

PROCESS OF MAKING A COLORED PHOTOGRAPHIC IMAGE.

No Drawing. Application filed October 16, 1919. Serial No. 331,068.

*To all whom it may concern:*

Be it known that I, LEON F. DOUGLASS, a citizen of the United States, residing at San Rafael, in the county of Marin and State of California, have invented new and useful Improvement in Processes of Making a Colored Photographic Image, of which the following is a specification.

This invention relates to color photography, and more especially to a process of treating black silver images whereby to convert them into colored images.

The principles involved in the conversion of a black silver photographic image into a colored image by means of a specified mordanted dye colored image, are first to convert the image into one that will mordant dyes and then to dye, or vice versa. The conversion of the black silver image into one that will mordant dye can and has been done in several ways. The hereinafter described process, however, is new and very simple and efficient. The mordanting images are colorless or of such color that they will not interfere with the color given by the dye bath and therefore the desired final color.

The process can be used with any black silver photographic images, positive or negative, for the purpose of color photography, or color motion picture photography, and an image of any color, or combination of colors any depth or hue obtainable with alkali or basic dyes can be produced.

This process is dependent upon the conversion of the ordinary black silver image of the color positive for instance, into an iron blue toned or cyanotype image, which, when further treated as described, will mordant strongly basic dyes.

In the simplest form the process owes its effectiveness to an iron compound, probably of a basic nature. This compound is formed in the image when the blue toned image is treated with an alkaline solution, coincidentally with the dissolution and removal of the blue color of the blue toned image. In another form, this image is combined with other mordanting elements, by modifying the alkaline solution used in the treatment. The general method of treatment remains the same, however, and there is no deviation of the principle of the conversion which may be simply stated to be a conversion of a black silver photographic image into a colored photographic image, by first converting the black silver image into an iron blue toned image and thereafter treating the same chemically to cause it to mordant basic dyes and to lose its blue color, leaving finally an image of desired color.

If an ordinary blue toned photographic image be treated with an alkaline solution, say a 0.2% solution of sodium hydroxide in water, the blue color is discharged, and the residual image is clear and colorless, or slightly yellowish if a deep black image had been used.

The image in this condition will but slightly, if at all, mordant basic dyes. If, however, the blue image is placed in a basic dye bath for a sufficient length of time to insure complete penetration, and then treated with the alkaline solution, the image after the blue color has disappeared, will be a mordanted dye image, of a color due to that of the dye bath used.

If the blue image be dissolved out with an alkaline solution containing a lead salt, the residual or the treated image will readily mordant basic dyes. In this case the lead plays a definite part in the conversion of the iron blue image into a colorless mordanting image.

The color of the residual image in either of the variations of the process will not interfere with the reds or the greens, nor will a residuum of the blue of the blue tone interfere with the greens. The particular effectiveness of this process is that the same solutions except the dye used and the same manner of treatment is applied for the production of any color.

Any of the typical soluble alkali hydrates or carbonates may be used, as for instance those of the alkali metals, sodium and potassium, and ammonium and these in varying strengths; say, from 2% to 0.2%.

The production of the red positive will be described as illustrative of the mode of operation.

A proper green selection positive silver image is toned to the desired degree, preferably completely, by means of an iron toning process.

An effective bath is—

| | |
|---|---|
| Potassium bichromate | .005 grams |
| Ferric ammonium sulphate | 2.500 grams |
| Oxalic acid | 6.000 grams |
| Potassium ferricyanide | 2.000 grams |
| Ammonium alum | 10.000 grams |
| Hydrochloric acid (10%) | 2.000 ccs. |
| Water to make | 1000.000 ccs. |

The toned image is then washed in water to remove the excess of adhering toning solution, to prevent excessive contamination of the next used solution.

The image is then placed in a dye bath. An effective dye bath is made up as follows:

| | |
|---|---|
| Fuchsin P | .075 grams |
| Auramin O | 2.50 grams |
| Alcohol | 500.00 ccs. |
| Glycerin | 50.00 ccs. |
| Acetic acid, glacial | 10.00 ccs. |
| Water to make | 4000.00 ccs. |

Normally the time of dyeing in such a bath will be thirty minutes, though the time may be varied, depending upon the intensity of color desired.

From the dye bath the positive is removed to an alkaline bath. An intermediary washing may be made, but is not essential. An effective alkaline bath is—

| | |
|---|---|
| Water | 1000.00 grams |
| Sodium hydroxide | 2.00 grams |

As soon as the blue color has been discharged by the alkali, the positive is washed in an acid bath in which the excess of alkali is removed as well as the excess of dye. An acid bath of 2:1000 glacial acetic acid in water is effective.

If the black image had been only partially blue toned, the black may be removed if desired by a reducing solution; say, a chromic reducing solution or simply a ½% solution of chromic acid in water. This treatment not only removes the black remnants of the original image, but clears the final image and aids in fixing the dye.

The excess of chromic acid may be removed by washing in dilute sodium bicarbonate solution.

The print may be further cleared by a hypo or cyanide bath, as for instance, a 1% solution of sodium thiosulphate or of sodium cyanide. A final washing is desirable in plain water.

Other color fixing agents may be used such as metallic salts; acids such as tungstic, molybdic, phospho-tungstic; iodine and tannin.

If an alkaline lead solution is used, the procedure described may be varied as follows:

The blue toned image is treated with an alkaline lead solution until the blue color has been discharged, or until it has been discharged to the desired degree, but not longer than just necessary to bleach.

An effective alkaline lead solution is made up as follows:

| | |
|---|---|
| Lead nitrate | 1 gram. |
| Sodium hydroxide | 2 grams. |
| Water | 500 ccs. |

The image after this treatment is rinsed in water, plain or acidulated preferably, and placed in the dye bath. After complete dyeing, which will be effected very quickly, the image is washed until clear in acidulated water.

The film may be further treated as described previously as desired.

The green print is made in the exact same manner, save that instead of the green selection positive the red selection positive is used, and instead of the red dye combination, a green dye combination such as—

| | |
|---|---|
| Hydrochlorid or zinc double chlorid of tetramethyldiamidodichlorotriphenolcarbinol (known also as "Victoria Green 3 B") | 2.50 grams. |
| Auramin | .50 grams. |
| Alcohol | 500.00 ccs. |
| Glycerin | 50.00 ccs. |
| Acetic acid, glacial | 10.00 ccs. |
| Water to make | 4000.00 ccs. | is used. In connection with the production of the green print, it may be advantageous occasionally to reserve a residuum of the blue color of the blue toned image, or to simply modify the blue image with a yellow, say, auramin straight, to a green, good for all practical purposes.

Having thus described my invention, what I claim and desire to secure by Letters Patent is—

The process of making a colored photographic image from a black silver image, which consists in replacing the black silver image with an iron blue toned image, treating said converted image with a basic dye, and subsequently causing said image to mordant basic dyes by treating it with an alkaline solution.

In testimony whereof I have hereunto set my hand in the presence of two subscribing witnesses.

LEON F. DOUGLASS.

Witnesses.
M. C. FULLER,
PETER BACIGALUPI, Jr.